United States Patent
Knapp

[15] 3,690,034
[45] Sept. 12, 1972

[54] ENVIRONMENTAL SEED CELL
[72] Inventor: Philip B. Knapp, Lynbrook, N.Y.
[73] Assignee: Aptek Industries, Inc., Lynbrook, N.Y.
[22] Filed: March 8, 1971
[21] Appl. No.: 121,882

Related U.S. Application Data

[63] Continuation of Ser. No. 781,014, Dec. 4, 1968, abandoned.

[52] U.S. Cl. ................................................47/57.6
[51] Int. Cl. ...............................................A01c 1/06
[58] Field of Search ...................47/1, 57.6, DIG. 9

[56]         References Cited
             UNITED STATES PATENTS

| 3,284,209 | 11/1966 | Kelley | 47/57.6 X |
| 3,555,730 | 1/1971 | Brink | 47/57.6 |
| 3,561,159 | 2/1971 | Adams | 47/57.6 |
| 3,616,573 | 11/1971 | Clifford | 47/57.6 |

Primary Examiner—Robert E. Bagwill
Attorney—Arthur B. Colvin

[57] ABSTRACT

This invention relates to an environmental seed cell formed by compression to define a tablet, and method of making the same. The cell preferably includes two outer layers of particulate material of relatively large particle size and a central cushioning layer having a particle size substantially smaller than the average particle size of the material of the outer layer. The seed is embedded within the central cushioning layer in advance of pressure being applied against the outer layers to form the tablet, whereby the likelihood of damage to the seed is greatly reduced. Preferably the material is subjected to a greater pressure at its periphery and a lesser pressure at its central portions, thereby to form a tablet in which the material density is substantially greater in the peripheral area than the central area, and the thickness is greater in the central area than at the periphery. The seed is disposed in the central area.

By this means there is defined an environmental seed cell which is capable of withstanding the rigors of shipment and planting by mechanical planting mechanisms without destruction, while at the same time the seed, being in registry with the softer, less compressed central areas, is less subject to damage.

Preferably the material forming the outer layers is comprised of vermiculite which is of a laminar particle configuration, the vermiculite being admixed with substantial quantities of non-laminar particulate organic matter to prevent stratification of the vermiculite when the latter is subjected to tablet forming pressures.

20 Claims, 8 Drawing Figures

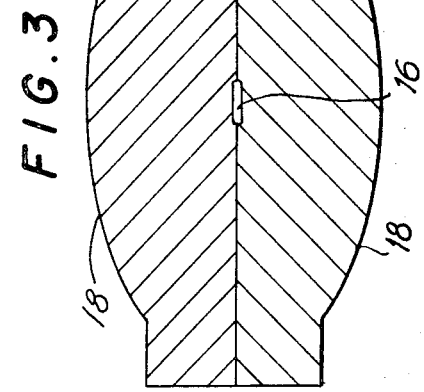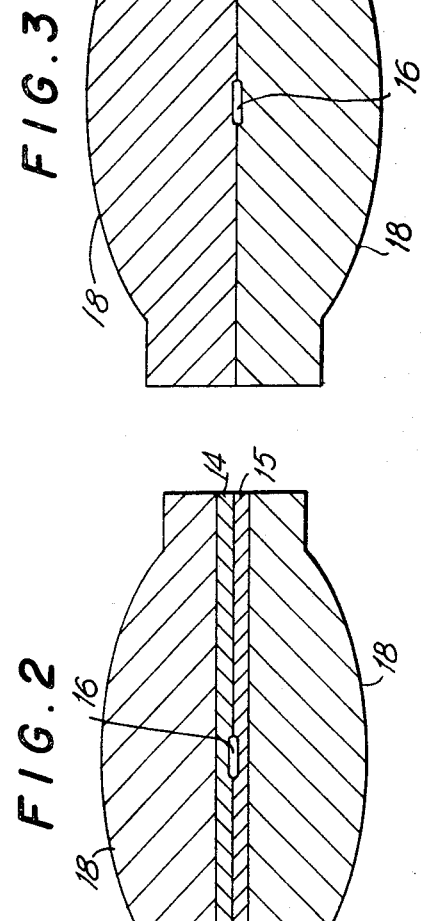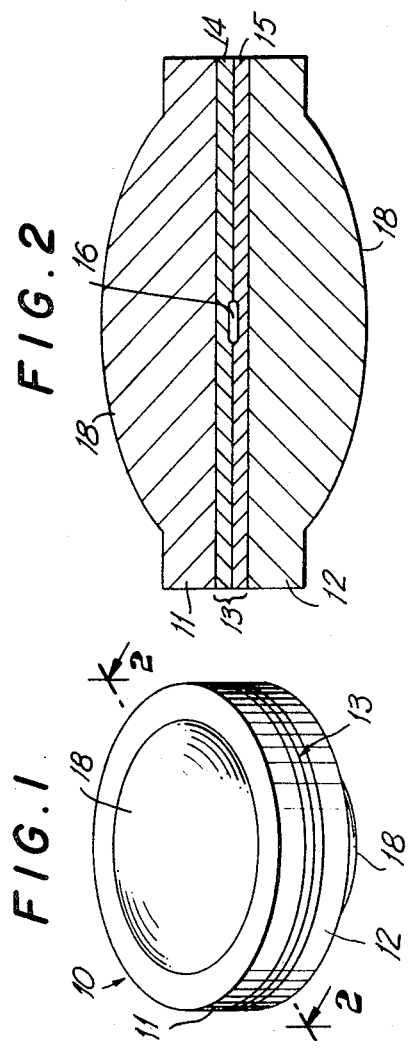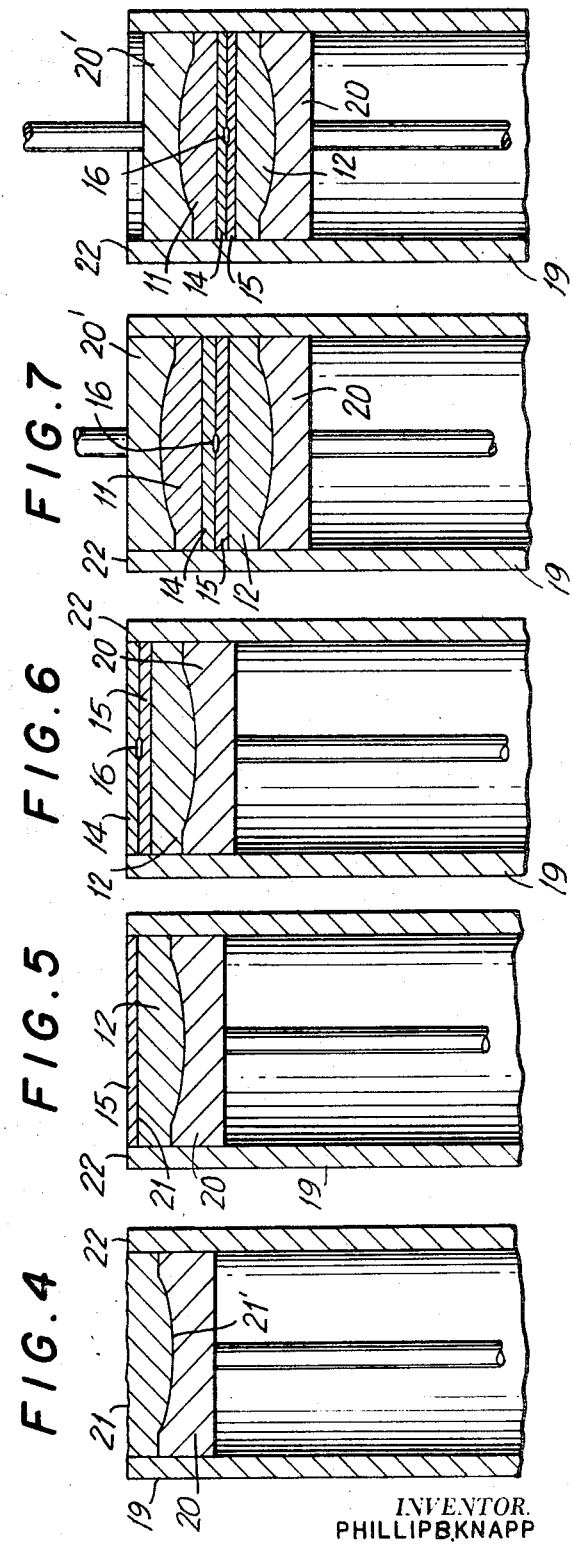

ENVIRONMENTAL SEED CELL

CROSS REFERENCE

This application is a continuation of my copending application Ser. No. 781,014, filed Dec. 4, 1968 (now abandoned) titled "Environmental Seed Cell."

Efforts have been made, for many years, to provide a seed cell which may readily be handled for planting, and especially for mechanical planting, and which, in a single unit, will provide a seed of desired type together with an encompassing environment which will promote rapid growth of the seed and permit rapid access of ambient moisture to the seed after planting.

Due to the delicate nature of most seeds, their often small size and irregular shape, it has been difficult, if not impossible, on any commercial scale, to take single seeds and insert the same into depressions or cavities in the ground located at the desired growth intervals. As a consequence, practices have been developed involving the use of one of two typical methods.

In accordance with one method, seeds are randomly planted in numbers exceeding the desired growing concentration. After germination, the seedlings are thinned to the desired concentration. Obviously, this operation is a wasteful procedure, both from the standpoint of employing unnecessary quantities of seed and, more importantly, from the standpoint of the labor involved in the thinning process.

In accordance with a further planting method, seeds are planted in flats and, after germination, seedlings are separated and individually planted at their desired growing location. This method is extremely time consuming and is obviously unsuited for mechanical planting and, hence, for large commercial planting operations.

In order to obviate the above described difficulties, it has been heretofore proposed to encase or enclose the seed proper in a jacketting material which will decompose or dissolve after planting. Preferably the jacketting material may incorporate nutriments or other substances conducive to the proper germination and growth of the seed.

By way of example, it has been heretofore proposed to process seeds by applying one or more coatings incorporating nutriments or like reagents. Such coating procedures have not solved the problems enumerated above since the coatings do not significantly increase the size of the seeds so as to permit the mechanical planting of single seeds at desirably spaced intervals. Moreover, coating procedures are disadvantageous in that they subject the seed to a moisturizing step inherent in the application of the coating material.

It has b-en determined that the germination rate of seeds and the hardiness of seedlings are adversely affected by the moisture applications inherent in the formation of the coating. Additionally, when a seed having one or more coatings applied thereto is planted, ambient moisture conditions may not be sufficient, within a desirably short period of time, to dissolve the coating and introduce moisture into contact with the seed itself to accellerate germination.

For the above reasons, although the concept of coating seeds has been known for some time, substantial commercial use of coated seeds has not been undertaken.

In a further attempt to provide an environmental seed cell, it has been proposed to introduce a seed into a particulate mass of vermiculite admixed with a binder, and formed the mass into an integral unit by compression. Such planting unit is advantageous as contrasted with coated seeds in that rapid moisture access to the seed may be had. However, such environmental seed units create other problems.

Where sufficient compressive force is applied to provide a seed cell of structural integrity adequate for mechanical planting, the percentage of germinating seeds is drastically reduced, due to damage of the seed proper. Where lesser pressure is applied in the process of manufacturing such environmental seed units, the units are found to be extremely fragile, requiring considerable care in packing and shipping, and necessitating hand planting since the units are unable to withstand the tumbling inherent in mechanical planting devices.

A further drawback encountered in environmental seed cells employing vermiculite has been determined to lie in the strong tendency of vermiculite to stratify upon the application of pressure. In this regard it should be recalled that vermiculite is essentially laminar in configuration and when such laminar material is compressed, the planes of the lamellae tend to become aligned in an orientation substantially perpendicular to the axis of the compressive force. When an oriented vermiculite seed cell is exposed to moisture, the vermiculite tends to expand in a direction normal to the planes of the lamellae. While the tendency of vermiculite to expand is desirable, it will be appreciated that expansion in one direction only may be undersirable.

The reason for such undesirability lies in the tendency of a depression in the soil to expand or increase in diameter. If a laminated vermiculite cell is implanted so that the planes of the vermiculite are perpendicular to the axis of the hole in the soil and the soil expands in a sidewise direction, there remains an annular air space surrounding the cell. Obviously the presence of such air space is not conducive to conducting moisture to the seed or the partially germinated seedling. Additionally, the roots and other parts of the germinated seedling can escape from the laminated vermiculite environment only by growth in a direction parallel to the planes of the lamellae, thereby further increasing the likelihood that the roots, etc. will extend into the annular air space causing the seedling to wither or at least retarding its growth.

It is for this reason that compressed vermiculite tablets heretofore known have required special planting equipment which will handle the tablets gently, by reason of their fragility, and which will orient the position of the tablets relative to the soil so that expansion may be in a direction perpendicular to the axis of the hole in the soil.

The invention may be summarized as directed to an improved environmental seed cell and method of making the same.

In accordance with a preferred embodiment, the cell is defined of three layer construction, including upper and lower outer layers of relatively large particle size, to promote expansion, the seed per se, being embedded within an intermediate cushioning layer of relatively small particle size. The provision of such cushioning layer enables considerable pressures to be exerted in the formation of the tablet without danger of injuring the seed, thereby enabling the production of a more rugged and stable seed cell, capable of withstanding shipment and susceptible of being planted by mechanical planting equipment.

Preferably, the seed cell is formed through the application of differential compressive forces, including relatively high compressive forces exerted in the peripheral area and relatively lower compressive forces exerted in the central area, within which area the seed is located. By this means there is formed a tablet having a rugged, relatively high density peripheral area, to withstand handling, and having a central, lower density area to cushion the seed and promote rapid disintegration of the tablet.

Preferably, the outer layers incorporate vermiculite which has been admixed with substantial quantities of non-laminar particulate material, such as peat moss or other cellulosic particulate material. By admixing such non-laminar particulate material with the vermiculite, the tendency of the vermiculite to stratify upon application of pressure is substantially overcome, resulting in the formation of a tablet which will expand more or less uniformly in all directions, reducing the possibility of a surrounding air space between the tablet and the soil and enabling the roots and other growing parts of the seedling to emerge in substantially any direction.

Optionally, but preferably, the cushioning layer may be comprised of a soluble material and the outer layers and the cushioning layer may incorporate nutriments and/or pesticides, fungicides or like reagents which will facilitate plant growth.

Accordingly, it is an object of the present invention to provide an improved environmental seed cell and method of making the same.

A further object of the invention is the provision of a cell of the type described which is capable of withstanding the rigors of mechanical planting and shipment without danger or damage to the seed per se.

Still a further object of the invention is the provision of a seed cell of the type described wherein outer layers of relatively large particle size are employed in conjunction with a central or cushioning layer of relatively smaller particle size so as to minimize the likelihood of damage to the seed in the course of compressing the ingredients to define a planting unit.

Still a further object of the present invention is to provide an environmental seed cell of the type described wherein the outer layers are comprised of a mixture of laminar material and non-laminar particulate material, whereby the tendency of the laminar material to stratify when subjected to compressive forces is counteracted.

Still a further object of the invention is to provide a seed cell of the type described wherein mechanical planting may be effected without the necessity for orienting the cell relative to the soil.

Still a further object of the invention is the provision of a cell of the type described wherein, after the recess in which the cell is planted is covered and watered in the conventional manner, the seed will be provided with the most desirable conditions for effective germination and subsequent growth.

Still a further object of the invention is to provide a novel method of manufacturing a seed cell having the above described desirable properties.

According to the invention, these objects are accomplished by the arrangement and combination of elements and the method hereinafter described and more particularly recited in the claims.

In the accompanying drawings in which is shown one of the various possible embodiments of the several features of the invention;

FIG. 1 is a perspective view of a seed cell according to the invention,

FIG. 2 is a transverse sectional view taken along the lines 2—2 of FIG. 1,

FIG. 3 is a view of the seed cell diagrammatically illustrating the changes in the cell after the latter has been watered, and FIGS. 4 to 8 are diagrammatic views illustrating a method and apparatus for manufacturing the seed cell.

Referring now to the drawings, as shown in FIGS. 1 and 2, the seed cell 10 comprises two outer layers 11 and 12 and an intermediate layer 13 which itself is formed from two layers 14 and 15. The seed 16 which may be of any desired type, such as a celery seed or a lettuce seed, is positioned between the two layers 14 and 15.

Each of the outer layers 11 and 12 is substantially in the form of a disc having a central mound or hemispherical portion 18 on one surface thereof located in the center of each disc. The seed cell illustratively is formed by positioning the material from which the layer 12 is formed in a mold 19 having a movable plunger 20 which has a central hemispherical depression 21' in the floor thereof as is illustratively shown in FIG. 4. The mold 19 is charged so that the top surface 21 of the material forming the layer 12 is level with the upper end 22 of the mold 19. The plunger 20 is then lowered slightly, say about one thirty-second inch and a layer 15 of cushioning material is positioned over the upper surface 21 of the layer 12 as shown in FIG. 5. The cushioning material consists of a compound which is preferably compressible, flowable and of extremely small particle size such as remilled "Sorbitol."

Thereupon, a seed 16 is deposited on the top surface of the layer 15 and the plunger is again depressed approximately one thirty-second inch and a second layer 14 of cushioning material is positioned over the first layer 15 and the seed 16, as shown in FIG. 6.

Due to the fact that the cushioning material is preferably compressible and the particle size of the cushioning material is very much smaller than the seed, the seed 16 will embed between the two layers 14 and 15.

Thereupon, the plunger 20 is again moved downwardly and a quantity of material 11 equal to the quantity of material utilized to form layer 12 is then positioned in the cavity as shown in FIG. 7. A second plunger 20' having a configuration identical to that of plunger 20 is positioned in the mold and with the plunger 20 illustratively restrained from movement, the plunger 20' is moved downwardly so that the layers 12, 15, 14, and 11 of material between the fixed plunger 20 and the movable plunger 20' will be compressed, the plunger 20' moving to the position illustratively shown in FIG. 8.

Since the distance between the peripheral portions of the plungers is less than the distance between the central portions of the plungers, it is apparent that there will be a greater compression of the material at the periphery of the finished tablet than at the central portion thereby preventing excess pressure on the delicate seed 16.

It will be evident from the above description that by reason of the configuration of the opposed faces of the plungers, a movement of one-half inch (by way of example) of the plungers toward each other may compact material interposed between the closely spaced peripheral portions at a ratio of perhaps ten to one from loose fill to compression. However, the same one-half inch movement, by reason of the greater spacing of the dished or deepest portions of the central parts of the plungers may result in only a three or four to one compaction ratio of the material disposed between these parts.

As noted, the apparatus disclosed in FIGS. 4 through 8 is essentially diagrammatic only. It will be readily recognized that the differential compaction desired whereby the central portion of the material is compressed to a first degree and the exterior to a second and greater degree may be effected in any of a variety of ways, i.e., by compression mould members wherein a movable sleeve is disposed in surrounding relation of a central die or plunger and wherein the initial forming pressures may involve equal movement of the center and sleeve portions, subsequent inward movement of the sleeve portions providing the additional compaction forces adjacent the periphery.

Since the material being compressed has a rather high viscosity and because of the limited flow properties of this rather high viscosity material, a reenforcing peripheral ring is formed to impart superior strength to the entire tablet without imposing excessive compressive force to the bulk of the tablet, or causing excessive pressure to be exerted on the seed. In addition, as explained above, by reason of the shape of the plungers and by varying the distances the plungers move, and the thickness of the loose fill layers, a series of compression ratios are possible to establish which enables a preferred range of pressures as follows: The central portion at a ratio of 3-1 (from loose fill to compression) and the peripheral portion of 6-1 (from loose fill to compression) to a compression ratio at the central portion of 5-1 (from loose fill to compression) and a compression ratio at the peripheral portion of 20-1 (from loose fill to compression).

Furthermore, the seed is protected by the layers of cushioning material 14, 15 between which it is embedded.

The tablet thus formed is thus a compacted mass of material which may readily be handled without disintegration to facilitate its subsequent handling and planting by automatic equipment.

As is clearly set forth herein, damage to the seed is further prevented by reason of the fact that the material of the cushioning layer or layers 13 is of small particle size, thereby preventing any localized deep indentation in the hull of the seed, with the consequent possible damage to the seed. In contrast, in the event that large particles were disposed against the seed hull, areas of high localized pressures against the hull, corresponding to apices or facets of the particles will frequently result. The cushioning layer, in short, acts in a manner akin to a fluid by reason of its small particle size, resulting in the transmission to the seed of an overall, substantially equal pressure rather than areas of localized extremely high pressure surrounded by areas in which there is less pressure.

By reason of the fact that the periphery of the tablet is relatively highly compacted, the tablet will retain substantially its integrity of shape even if the central portions thereof which are under lesser compaction should tend to disintegrate.

According to the invention, the outer layers 11 and 12 are formed from a mixture of materials which will provide the desired characteristics that will permit proper germination and growth of the seed when the seed cell is implanted.

In the illustrative embodiment of this invention, herein shown and described, each of the layers 11, 12 is formed from a mixture of peat moss or sphagnum moss, wood cellulose, vermiculite, lime, a wetting agent, potassium nitrate, diammonium phosphate and an adhesive binder. Each of these ingredients performs a specific desired function. Thus, the moss, in addition to being a highly efficient water retention material is very acid and therefore through the addition of lime the pH factor of the environment can be adjusted to its most desirable level; the wood cellulose increases capillarity of the tablet and in addition, because of its fibrous nature assists in binding the compressed particles together. The vermiculite which is basically ground mica powder, is also highly water retentive and in addition to being highly hygroscopic, as is the moss and wood cellulose, will tend to expand rapidly when the tablet is immersed in water providing a large number of capillary passageways therethrough for flow of water to the seed from the soil and also softening quickly so that it becomes readily penetratable by the seed as the latter germinates. The combination of the fibrous materials such as moss, wood cellulose with the vermiculite prevents stratification of the vermiculite when it is compressed so that the roots of the seed, as the latter germinates, may readily penetrate and emerge from the tablet in any direction thereby dispensing with the need for orienting the tablet when it is planted. The function of the binder is to enable the particles to adhere together when compacted to form an integral unit.

The vermiculite is added to the moss and wood cellulose because it has a far greater initial water absorbency and expandability and will break apart the compaction of the moss and wood cellulose fibers for more effective capillary action.

The mixture may also include a wetting agent such as "Maprofix" which serves in conventional manner to effect more rapid dispersion of the water into the compacted material.

The mixture in addition contains an appropriate amount of lime which is dependent upon the amount of moss to regulate the pH factor of the mixture for most efficient germination of the particular seed involved.

In addition to the foregoing materials, the mixture may contain nutrients such as potassium nitrate and diammonium phosphate which are conventional fertilizers to provide the most effective growth conditions for the seed upon initial germination thereof.

The ingredients above described which are part of the outer layers 11 and 12 may be in any suitable proportions consonant with the objectives hereof. It has been found that a desired range of ingredients would be as follows:

1.5 to 7.2 parts by weight of moss;
1.0 to 2.5 parts by weight of wood cellulose;
1.5 to 7.2 parts by weight of vermiculite;
2.5 to 4.5 parts by weight of lime to the weight of moss;
0.005 to 0.05 parts by weight of wetting agent;
0.015 to 0.075 parts by weight of potassium nitrate, and
0.015 to 0.075 parts by weight of diammonium phosphate.

In combining the ingredients for the layers 11 and 12 of the tablet, the ingredients are first reduced to a maximum particle size of between about 20 and 40 mesh and are mixed substantially dry, with the water content of the moss being not in excess of 13 to 15 percent by weight.

The mixture of particles is then combined by way of example with a suitable adhesive binder which may consist of polyvinylpyrrolidone (PVP), polyvinyl acetate, polyvinyl alcohol (PVA), shellac and polyvinylpyrrolidone.

The quantity of adhesive binder material which may be employed, as is well known in the art, may be varied within a range of parameters determined by the amount of pressure to be applied, the speed with which it is desired that the cells dissolve, and the structural integrity which it is desired that the cells possess. The adhesive is normally applied as a solution to the particles of the outer layer. Obviously the addition of larger quantities of binder will increase the wear-resistance of the cells but will reduce the speed with which the cells will disintegrate after planting. It is within the skill of the worker in the art to modify the various factors including binding composition and quantity and pressure, depending upon the desired end characteristics of the cell.

After the adhesive mix is added to the mix of the ingredients previously described, one-fourth of 1 percent by weight of a desired lubricant such as magnesium stearate may be added. The purpose of this lubricant is to facilitate manufacture by preventing sticking of the tablet to the plungers and rupture during the course of manufacture.

The layers 14 and 15 which define the cushion or blanket are formed by reducing the cushioning material such as "Sorbitol" to a preferred micron size of approximately 100 to 75 and thereupon adding say, one-fourth of 1 percent by weight of a suitable anti-caking agent such as "Cab-O-sil" which is sold by the Cabot Chemical Corporation.

In use of the tablet, it may be positioned directly on the ground and tamped slightly thereinto or buried up to one-half inch below the surface. The tablets would be located in equally spaced recesses in the ground so as to provide a proper distribution for sufficient growth to maturity.

After the tablet is planted, the ground is watered. As a result of the materials from which the tablet is formed, the cushion layer of "Sorbitol" which is water soluble, will quickly and completely dissolve and wash away. At the same time, due to the hygroscopic properties of the vermiculite, moss and wood cellulose, the outer layers 11 and 12 will rapidly expand in all directions and become extremely porous.

The above noted expansion will cause the inner surfaces of such layers 11 and 12 to come together to fill up the void resulting from the displacement of the cushioning layers of "Sorbitol" and contact the seed 16 (see FIG. 3). Due to the expansion of the outer layers 11, 12 and the flow of water therethrough by capillary action, the lime will go into solution and interact with the moss to provide the desired pH factor of the mixture, required by the seed. In addition, the potassium nitrate and diammonium will also go into solution to provide the desired nutriments for the seed. Due to the fact that the seed was initially covered by the cushioning layers 11 and 12, there was no direct contact of any of the ingredients of any of the outer layers 11 and 12 with the seed which could have caused injury to the seed. If a part of the lime, for example, in its dry state had been in contact with the seed, it would injure the seed. However, in solution none of the ingredients of the outer layers are deleterious to the seed. Because of this protection factor, it is also possible to add systemic poisons to the outer layers of the mix.

Due to the expansion in all directions of the outer layers 11 and 12, the seed itself is always directly contacted by the inner surfaces of the outer layers and the outer surfaces of the outer layer will compress against the encompassing soil so that there will be no discontinuities therebetween which could interfere with efficient capillary flow of water from the soil to the seed. Furthermore, as the seed germinates and grows, the roots of the seed can readily pass through the outer layers of the tablet, due to the expansion thereof and thence into the soil since there would be no discontinuities or gaps which prevent efficient growth of roots.

The tablet above described, by reason of its compact nature and uniform size, may readily be handled both for initial shipping, storage and by mechanical equipment for planting.

The tablet provides an ideal environment to promote germination, emergence and a high and uniform yield at harvest.

Having thus described my invention, what I claim as new and desire to secure by Letters Patent of the United States is:

1. An environmental seed cell formed by compression, comprising two outer layers, an intervening cushion layer contacting the adjacent surfaces of said outer layers, and a seed embedded in said cushion layer, said outer layers comprising a mixture which includes a laminar material such as vermiculite, and a binder, said vermiculite being of a maximum particle size of about 20 mesh, said cushion layer comprising a finely divided material of a particle size substantially smaller than said vermiculite.

2. The seed cell of claim 1 wherein said cushion layer is comprised of a soluble material.

3. The seed cell of claim 1 characterized by the edge portions of said cell being compacted to a greater density than the central portions of said cell to define a composite seed cell having a re-enforced peripheral portion, said seed being in registry with said central portion.

4. The seed cell of claim 1 wherein said outer layer includes non-laminar particulate organic matter, said organic matter constituting at least about one-third of the weight of the material of said outer layer, whereby the tendency of said vermiculite to stratify when subjected to compression is substantially reduced.

5. The seed cell of claim 4 wherein said organic particulate matter comprises peat moss.

6. The cell of claim 5 wherein said outer layer includes, in addition, wood cellulose.

7. The cell of claim 2 wherein said outer layer comprises about 1.5 to 7.2 parts by weight of peat moss, 1.0 to 2.5 parts by weight of wood cellulose, and 1.5 to 7.2 parts by weight of vermiculite.

8. An environmental seed cell comprising two outer layers, an intervening cushion layer contacting the adjacent surfaces of said outer layers and a seed embedded in said cushion layer, said cell being formed by the application of pressure in a direction normal to said layers, said outer layers comprising a mixture which includes vermiculite, peat moss and wood cellulose of a maximum particle size of about 20 mesh, and a binder, said cushion layer comprising a soluble, finely divided material of a particle size substantially smaller than the particle size of the material of said outer layer, the density of the edge portions of said cell being substantially greater than the density of the central portion of said cell, said seed being in registry with said central portion.

9. The seed cell of claim 8 wherein the average particle size of said cushion layer is less than about 100 microns.

10. The seed cell of claim 9 wherein said outer layers include 1.5 to 7.2 parts by weight moss; 1.0 to 2.5 parts by weight wood cellulose; and 1.5 to 7.2 parts by weight vermiculite, and said cushion layer comprises "-Sorbitol" and an anti-caking agent.

11. The cell of claim 8 wherein said edge portions of said cell have been compressed from about 6 to 1 to about 20 to 1 from loose fill to compression, and said central portion has been compressed from about 3 to 1 to about 5 to 1 from loose fill to compression.

12. An environmental seed cell formed by compression, comprising two outer layers and an intervening cushion layer contacting the adjacent surfaces of said outer layers, the particle size of said cushion layer being smaller than the particle size of said outer layers, the material of said outer layers including a binder, said cell including a peripheral portion compacted to a first density, and a central portion compacted to a second density less than said first density, and a seed member disposed in said cushion layer in registry with said central portion, whereby said periphery defines a re-enforced surround area, thus to provide a cell of increased durability.

13. The cell of claim 12 wherein said peripheral portions have been compressed from about 6 to 1 to about 20 to 1 from loose fill to compression, and said central portion has been compressed from about 3 to 1 to about 5 to 1 from loose fill to compression.

14. The cell of claim 13 wherein the average particle size of said outer layer does not exceed about 20 mesh.

15. The cell of claim 14 wherein the material of said cushioning layer is soluble and of average micron size less than 100.

16. The method of making an environmental seed cell which will readily disintegrate when subjected to ambient moisture conditions after planting but be of sufficient dimensional integrity to resist decomposition and crumbling during shipment and mechanical planting, comprising the steps of providing first and second outer layers of particulate material including a binder, interposing between said outer layers, central cushioning layers of smaller average particle size than said outer layers, interposing a seed member between said cushion layers substantially centrally thereof, and thereafter subjecting the central portions and the peripheral portions of said stacked layers to differential compacting forces applied in a direction normal to the plane of said layers, said peripheral portions being compacted to a greater degree than said central portion, whereby said peripheral portion is formed to a higher density and, hence, structural integrity than said central portions in registry with said seed.

17. The method in accordance with claim 16 wherein said compacting forces are applied to a degree to compress said central portions to a density of from about three to about six times the loose fill density, and said peripheral portions to a density of from about five to about 20 times the loose fill density.

18. An environmental seed cell formed by compression, comprising two outer layers and an intervening cushion layer contacting the entire adjacent surfaces of said outer layers, and a seed embedded in said cushion layer, said layers being formed of particulate matter.

19. The environmental seed cell in accordance with claim 18 wherein the particulate material of said outer layers is substantially larger than the material of said cushion layer.

20. The environmental seed cell in accordance with claim 19 wherein the size of said particles of said cushion layer is less than about 100 microns.

* * * * *